(No Model.)
J. A. WOODARD.
COTTON STALK CHOPPER.
No. 323,014. Patented July 28, 1885.
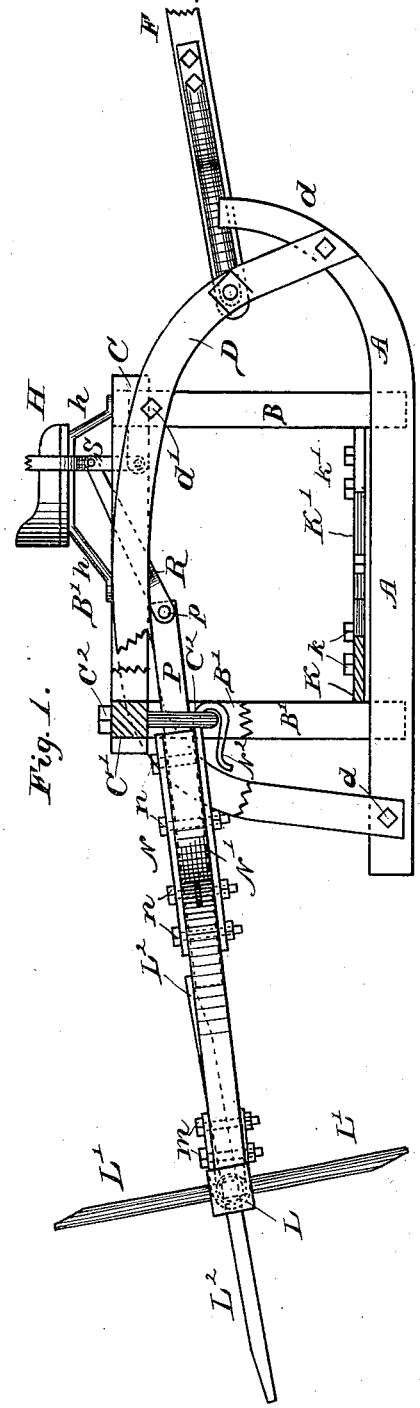
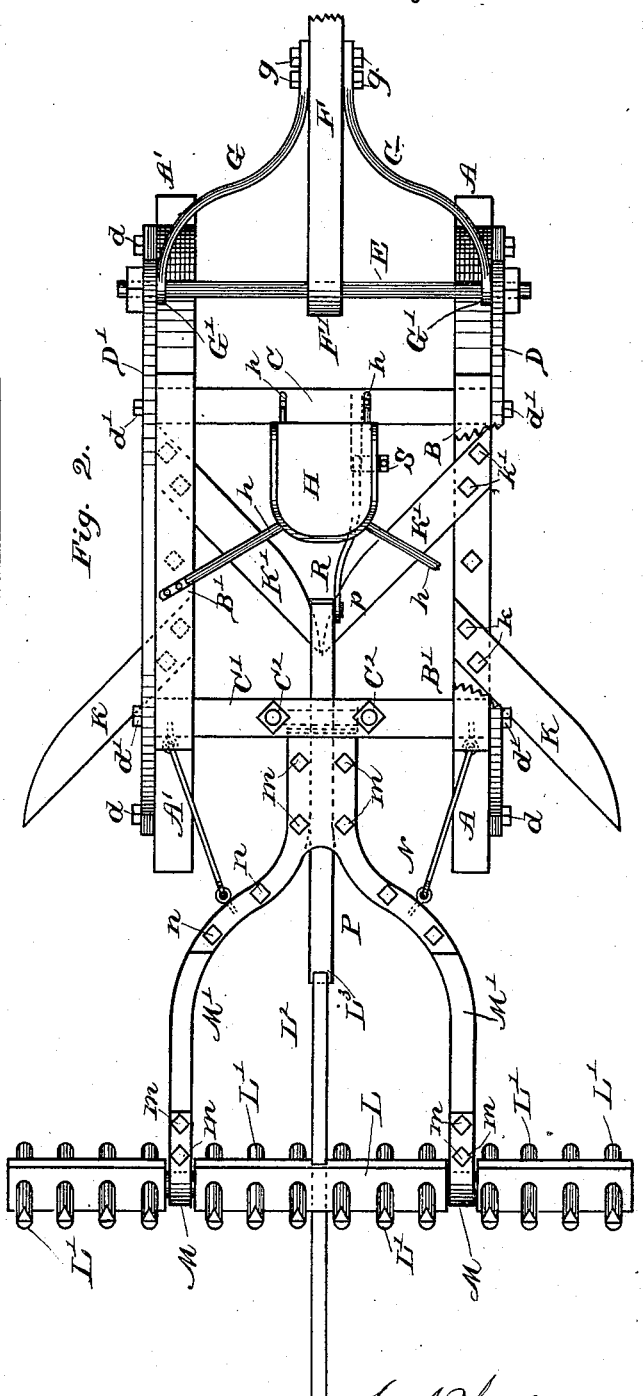
Witnesses
John C. Miller
Percy C. Bowen
J. A. Woodard
Inventor
By Lafayette Bingham
Attorney.

UNITED STATES PATENT OFFICE.

JAMES A. WOODARD, OF GRAPE VINE, TEXAS, ASSIGNOR OF ONE-HALF TO ANDREW J. HALFORD, OF SAME PLACE.

COTTON-STALK CHOPPER.

SPECIFICATION forming part of Letters Patent No. 323,014, dated July 28, 1885.

Application filed August 8, 1884. (No model.)

*To all whom it may concern:*

Be it known that I, JAMES A. WOODARD, of Grape Vine, Tarrant county, and State of Texas, have invented certain new and useful Improvements in Cotton-Stalk Choppers; and I do hereby declare that the following is a full, clear, and exact description of the invention, which will enable others skilled in the art to which it appertains to make and use the same, reference being had to the accompanying drawings, and to letters of reference marked thereon, which form a part of this specification.

The object of this improvement is to save time and labor in clearing fields of stalks or weeds. This result is attained by the mechanism illustrated in the drawings herewith filed as part hereof, in which the same letters of reference denote the same parts in the different views.

Figure 1 is a sectional side elevation of a stalk-cutter and rake embodying the features of my improvement. Fig. 2 is a top view.

A A' are sled-runners having a superstructure or draft-frame composed of vertical beams B B', transverse beams C C', and longitudinal beams B', connected to the sled-runners and to each other by any suitable means.

D D' are curved metal plates, bolted to the sled-runners, as shown at $d$, and to the vertical beams B, as shown at $d'$, for bracing the frame-work.

E is a rod transversely secured to the brace-plates D D' as a means of connection for the draft-pole F, flexibly connected thereto, as shown, by eyes G' of plates G, secured to the tongue F by bolts $g$.

H is a driver's seat, affixed to the draft-frame by rods $h$ or other suitable means.

K K and K' K' represent outwardly and inwardly projecting knives or stalk-cutters bolted to the sled-runners A A', as shown at $k\ k'$.

L is a beam provided with rake-teeth L' and a transverse bar, $L^2$, for a purpose hereinafter set forth.

The rake-beam L is arranged to revolve in straps M, secured by bolts $m$ to curved draft-beams M', the inner ends of which are secured by bolts $n$ to metal plates N N' in a way to form a recess for the reception of a sliding bar, P, flexibly secured by a pin, $p$, to a bar, R, which connects with a lever, S, suitably pivoted to an inward projection from the transverse beam C. The rake draft-beams M' are flexibly connected to the sled-frame by means of a hook, $N^2$, made integral or otherwise with the plate N', and a stirrup, $C^2$, bolted to the sled-frame, as shown. The tongue or draft-pole F is to be provided with the usual double and single trees for hitching the draft-animals.

As the mechanism is drawn through the field the outwardly and inwardly projecting knives K K' will engage with the stalks or weeds and cut them down. The rake will be held in position shown by the transverse bar $L^2$ of the rake-beam L coming in contact with the end of the adjustable or sliding bar P, operated from the seat by lever S and connecting-rod R, and the rake-teeth L' will engage with the severed stalks or weeds and draw the same along until the bar P is moved forward and made to clear the bar $L^2$, when the rake will make a half-revolution and release the accumulated weeds, when the bar P is again moved rearward and made to engage with the bar $L^2$, and the rake thus made to collect, draw, and release the weeds, as occasion may require.

I am aware that heretofore the rakes of stalk-choppers have been operated from the seat as well to bring the same into and withdraw it from action as to regulate its amount; but I herein only claim the specific combination whereby the uses of stalk-choppers are more economically and readily attained.

Having explained the construction and operation of my improvement, what I claim as new, and desire to secure by Letters Patent, is—

The frame mounted upon sled-runners A, and provided with braces D D', draft-pole F, and knives K K', in combination with the rake L, having check-bar $L^2$, the sliding bar P, connecting-bar R, and lever S, all co-operating in the manner and for the purpose described.

In testimony that I claim the foregoing as my own I affix my signature in presence of two witnesses.

J. A. WOODARD.

Witnesses:
J. W. BLEVINS,
S. W. SUTTON.